March 26, 1929.  T. BECHER  1,707,039
PACKING OF WEIRS
Filed Oct. 23, 1926
Fig. 1
Fig. 2
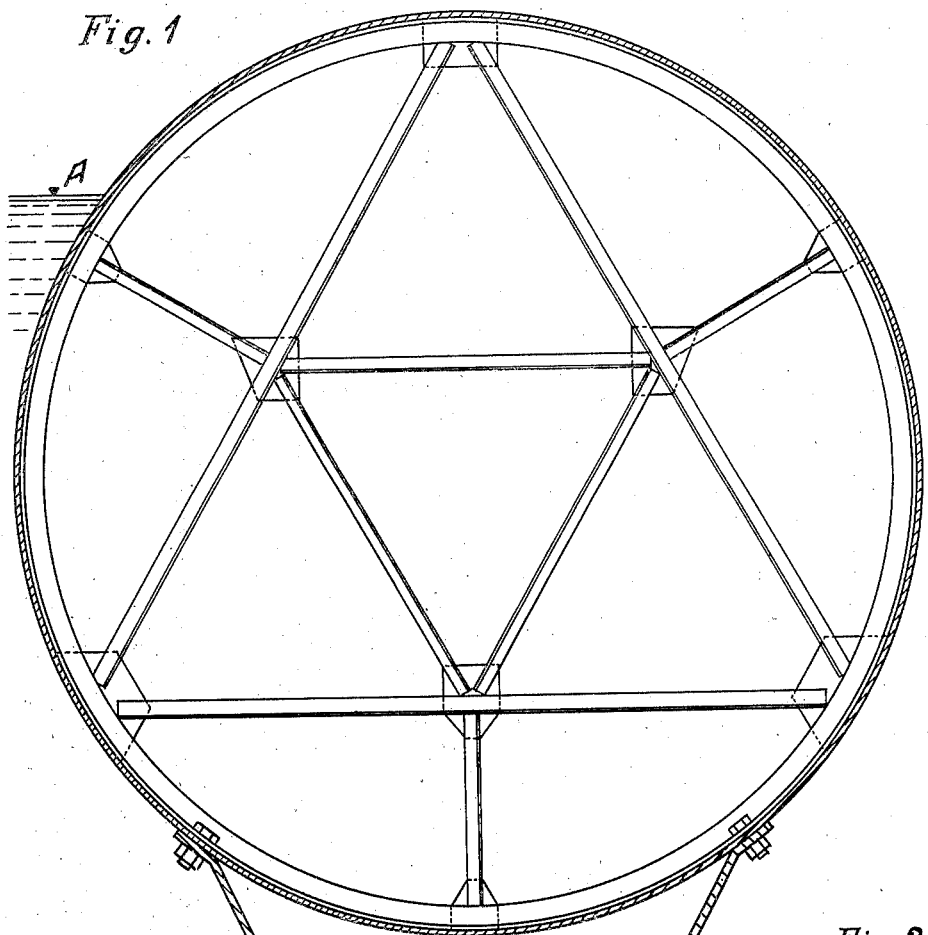
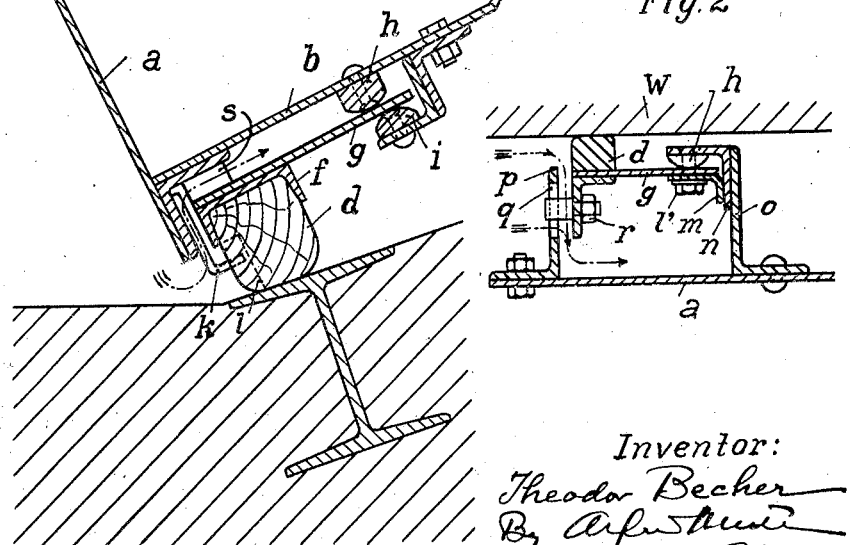
Inventor:
Theodor Becher Patented Mar. 26, 1929.

1,707,039

UNITED STATES PATENT OFFICE.

THEODOR BECHER, OF GUSTAVSBURG, GERMANY, ASSIGNOR TO MASCHINENFABRIK AUGSBURG-NÜRNBERG, A. G., OF NUREMBERG, GERMANY, A CORPORATION OF GERMANY.

PACKING OF WEIRS.

Application filed October 23, 1926, Serial No. 143,571, and in Germany October 30, 1925.

It is old to arrange the packing beam of water closures, e. g. sluice gates, weirs, etc., on a resilient plate, which is acted upon by the pressure of the head water, or backwater, whereby the packing beam will be pressed against the floor beam of the weir channel or against the lateral wall of the sluice channel. This old arrangement, however, has certain disadvantages. During the movement of the weir, the packing beam will slide upon its support and the frictional forces which are generated by this sliding motion must be taken up by the resilient plate, which therefore will be subject to tensional or crushing strains. If the plate is made sufficiently thin, to have good resiliency it will not be able to permanently resist this tensional or crushing strain; if, on the other hand, the plate is made strong enough to be able to resist the strain, it will loose its resiliency and therefore not to be able to produce a proper packing or tightening effect. While this drawback could apparently be avoided by the use of thin plates of high-grade material, the considerable expense involved by such a construction is prohibitive.

The aforementioned drawbacks are avoided by this invention, which consists essentially in the packing beam being arranged at one end of a rigid plate, while the other end of said plate is rotatably mounted. By reason of this, the plate which is acted upon by the pressure exerted by the head water, does not need to be resilient and therefore may be made sufficiently strong to resist the strains imposed thereupon, without necessarily being made a high-grade material.

In the accompanying drawing showing, by way of illustration an embodiment of the weir provided with the noval packing device according to this invention.

Fig. 1 is a transverse section of a roller weir, equipped with a packing device according to this invention, while Fig. 2 is a section through the packing device according to this invention for a movable closure, e. g. sluice-door.

In Fig. 1, $a$ is the damming plate of the weir, and $b$ a re-inforcing metal sheet. The packing beam $d$ is mounted upon the front end of the plate $g$ by the aid of a U-shaped iron bar $f$ surrounding the packing beam at its upper end. The rear end of the plate $g$ is kept in position by two ledges $h$ and $i$, which are properly fixed upon the body of the weir. The two ledges $h$ and $i$ are provided with curved surfaces which act as a support for the end of the plate $g$. In order to keep the plate $g$ and thereby the packing beam $d$ in proper position, the damming-plate $a$ of the weir projects at its lower edge to such an extent, that it will prevent the plate $g$ from sliding out between the two supporting ledges $h$ and $i$. In order to render the action of said ledges $h$ and $i$ still more efficient, hooks $k$ made of flat iron are provided on the damming-plate $a$, the bent front ends of said hooks engaging recesses $l$ provided in the packing beam. The plate $g$ and thereby the packing beam $d$ are pressed in well known manner against the floor of the water channel by the pressure of the head water indicated at A in Fig. 1, which is permitted to enter the space between the plate $g$ and the metal wall $b$ in the direction shown by the arrow. The ledges $s$, which are provided at intervals will in every case permit the water to pass to the rear of the plate $g$.

According to Fig. 2, which shows the packing device for use in connection with a sluice-gate the wall $a$ closes up the front side of the body of the weir and preferably projects beyond the latter. The lateral wall of the sluice-channel is designated by the reference letter $w$. The packing beam $d$ is here fixed upon a plate $g$, the rear end of which is supported by means of screw bolts $l$ upon the curved surface of the ledge $h$. The screws $l$ are drawn tight only to such an extent, that the plate $g$ will have a sufficient rolling motion upon the curvature of the supporting ledge $h$. The end of the plate $g$, which is kept in fixed position is tightened by means of a band $m$ against the tail water, said band consisting of leather, rubber or the like. The one longitudinal part of the band $m$ is kept in position by the screws $l$ while the other longitudinal part of the band $m$ will be automatically pressed against the angle iron $n$ by the pressure of the back water. The angle iron $n$ is fastened upon the shield $a$ by means of a second angle iron $o$. In order to provide a sufficient guiding means for the plate $g$, the wall $a$ carries at its outer end a further angle iron $p$, which is provided with holes $q$. The plate $g$ is provided with bolts $r$ at its movable end, said bolts $r$ entering said holes $q$, thereby preventing the plate $g$ together with the packing beam $d$ from changing their position beyond the movement, which is necessary in order to procure a proper tightening effect.

The packing beam $d$ of Fig. 2 is pressed against the wall of the sluice-channel, the same as in the construction shown in Fig. 1, by the pressure exerted by the head water, which enters the enclosure in the direction as indicated by the arrows.

The packing device, shown in Fig. 2 may also be used like the packing device shown in Fig. 1. In that case the device shown in Fig. 2 only has to be turned around, so that the packing beam $d$ will be directed downwardly instead of upwardly.

I claim:

1. In a weir, or the like, a box attached to the weir, a movable rigid plate forming a wall of said box, a packing beam secured to one edge of said plate outside of said box, means loosely and pivotally supporting the other edge of said plate, and means for conducting the head water to said box for exerting an outwardly directed pressure upon said plate thereby pressing said packing beam into sealing position.

2. In a weir, or the like, a damming plate forming part of the weir, a reinforcing plate therefor, rounded ledges provided on said reinforcing plate, a rigid plate loosely mounted with its one edge between said ledges so as to pivot thereon, a packing beam carried by the other edge of said plate, said plate being so disposed as to be pressed by the head water into sealing position.

3. In the combination as specified in claim 2, a projection on said damming plate for holding said plate in operative position between said ledges.

In testimony whereof I affix my signature.

THEODOR BECHER.